(12) United States Patent
Johansson et al.

(10) Patent No.: US 10,601,227 B2
(45) Date of Patent: Mar. 24, 2020

(54) POWER PLANT RAMP RATE CONTROL

(71) Applicant: ABB SCHWEIZ AG, Baden (CH)

(72) Inventors: Nicklas Johansson, Västerås (SE); Tomas Tengner, Västerås (SE); Mikko Huotari, Mäntsälä (FI)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/759,608

(22) PCT Filed: Sep. 14, 2015

(86) PCT No.: PCT/EP2015/070955
§ 371 (c)(1),
(2) Date: Mar. 13, 2018

(87) PCT Pub. No.: WO2017/045698
PCT Pub. Date: Mar. 23, 2017

(65) Prior Publication Data
US 2019/0052088 A1   Feb. 14, 2019

(51) Int. Cl.
*G05B 19/042* (2006.01)
*H02J 3/38* (2006.01)
(Continued)

(52) U.S. Cl.
CPC ............ *H02J 3/383* (2013.01); *G05B 19/042* (2013.01); *H02J 3/28* (2013.01); *H02J 3/382* (2013.01);
(Continued)

(58) Field of Classification Search
CPC .................................................. G05B 19/042
See application file for complete search history.

(56) References Cited

U.S. PATENT DOCUMENTS

| 8,295,989 B2 | 10/2012 | Rettger et al. |
| 2007/0001461 A1 | 1/2007 | Hopewell |
(Continued)

FOREIGN PATENT DOCUMENTS

| CN | 103762616 A | 4/2014 |
| DE | 10 2013 000 235 A1 | 7/2014 |

OTHER PUBLICATIONS

International Preliminary Report on Patentability, issued in PCT/EP2015/070955, dated Jan. 25, 2018.
(Continued)

*Primary Examiner* — Tejal Gami
(74) *Attorney, Agent, or Firm* — Birch, Stewart, Kolasch & Birch, LLP

(57) ABSTRACT

A method for controlling plant active power output ramp rate of a power plant to a PCC with a power grid includes obtaining information about a current RES active power output of a Renewable Energy Source (RES) in the power plant. The method also includes forecasting future RES active power output, during a predefined future time period. The method also includes, based on the obtained current RES active power output information and on the forecasted RES active power output, determining whether an expected ramp rate of the RES active power output during the predefined time period exceeds a predefined maximum ramp rate limit of a plant active power output. The method also includes, based on the determining, selecting a first control method which is based on the forecasted future RES active power output if it is determined that the expected ramp rate exceeds the predefined maximum ramp rate limit, or selecting a second control method, different from the first control method, if it is determined that the expected ramp rate does not exceed the predefined maximum ramp rate limit. The method also includes using the selected first or second control method to generate an ESS control signal for con-
(Continued)

trolling the ESS active power output $P_{ESS}$ such that the plant active power output ramp rate is kept below the predefined maximum ramp rate limit during the predefined time period.

20 Claims, 5 Drawing Sheets

(51) Int. Cl.
*H02J 3/28* (2006.01)
*H02J 3/46* (2006.01)
*H02J 3/00* (2006.01)

(52) U.S. Cl.
CPC ............... *H02J 3/386* (2013.01); *H02J 3/46* (2013.01); *G05B 2219/2639* (2013.01); *H02J 2003/007* (2013.01); *Y02E 60/76* (2013.01); *Y02E 70/30* (2013.01); *Y04S 40/22* (2013.01)

(56) References Cited

U.S. PATENT DOCUMENTS

| | | |
|---|---|---|
| 2010/0198420 A1 | 8/2010 | Rettger et al. |
| 2010/0204844 A1 | 8/2010 | Rettger et al. |
| 2014/0142776 A1 | 3/2014 | Nielsen et al. |

OTHER PUBLICATIONS

International Search Report, issued in PCT/EP2015/070955, dated May 20, 2016.
Written Opinion of the International Preliminary Examining Authority, issued in PCT/EP2015/070955, dated Sep. 4, 2017.
Written Opinion of the International Searching Authority, issued in PCT/EP2015/070955, dated May 20, 2016.

POWER PLANT RAMP RATE CONTROL

TECHNICAL FIELD

The present disclosure relates to a method for controlling an active power output ramp rate of a power plant to a Point of Common Coupling (PCC) with a power grid.

BACKGROUND

Renewable Energy Sources (RES) such as wind and solar power are increasing rapidly in the world. In small grids with high RES penetration, such as on islands, the fast intermittent fluctuations of RES put a challenge to conventional regulation units such as thermal plants and gas generators.

With increasing amounts of RES in the power grids and with growing sizes of the renewable power plants, regulators and Transmission System Operators (TSOs) are implementing new grid codes that put constraints on maximum active power ramp rates.

System integrators have started to install Battery Energy Storage Systems (BESS) to meet these constraints.

A standard ramp rate control method for controlling a BESS does not require any forecast of the RES power output, but ramp rate control methods exist which use forecasting.

U.S. Pat. No. 8,295,989 discloses controlling ramp-down rate in response to a prediction of an overly rapid reduction in system output. In this procedure, a ramp-down rate that would otherwise exceed the rate of change tolerable by the grid can be kept within tolerable limits if the power loss is predicted in advance.

US 2010/198420 discloses tracking movement of clouds is used to predict the effects of cloud cover on irradiation of a solar-powered distributed power generation system. The predictions enable a solar power plant to maintain the changes in its total power output within operating requirements with less or no dependence on energy storage.

SUMMARY

It is an objective of the present invention to reduce the energy storage cost, by means of a system and control method that take forecast data as input to the Energy Storage System (ESS) controller. The developed control method enables the ESS to be smaller in terms of power and energy rating. Moreover, the storage energy throughput can be reduced, which reduces associated losses and increases the ESS lifetime, e.g. battery lifetime in case of a BESS.

According to an aspect of the present invention, there is provided a method for controlling plant active power output ramp rate of a power plant to a Point of Common Coupling (PCC) with a power grid. The method comprises obtaining information about a current RES active power output of a Renewable Energy Source (RES) comprised in the power plant. The method also comprises forecasting future RES active power output, during a predefined future time period. The method also comprises, based on the obtained current RES active power output information and on the forecasted RES active power output, determining whether an expected ramp rate of the RES active power output during said predefined time period exceeds a predefined maximum ramp rate limit of a plant active power output. The plant active power output is a combination of the RES active power output and an ESS active power output, of an Energy Storage System (ESS) comprised in the power plant, at any given time. The method also comprises, based on said determining whether the expected ramp rate exceeds the maximum ramp rate limit, selecting a first control method which is based on the forecasted future RES active power output if it is/was determined that the expected ramp rate exceeds the predefined maximum ramp rate limit during the predefined time period, or selecting a second control method, which is different from the first control method, if it is/was determined that the expected ramp rate does not exceed the predefined maximum ramp rate limit during the predefined time period. The method also comprises using the selected first or second control method to generate an ESS control signal for controlling the ESS active power output such that the plant active power output ramp rate is kept below the predefined maximum ramp rate limit during the predefined time period.

According to another aspect of the present invention, there is provided a computer program product comprising computer-executable components for causing a controller to perform an embodiment of the method of the present disclosure when the computer-executable components are run on processor circuitry comprised in the controller.

According to another aspect of the present invention, there is provided a controller for controlling plant active power output ramp rate of a power plant to a PCC with a power grid. The controller comprises processor circuitry, and a storage unit storing software executable by said processor circuitry whereby said controller is operative to obtain information about a current RES active power output of a RES comprised in the power plant. The controller is also operative to forecast future RES active power output, during a predefined future time period. The controller is also operative to, based on the obtained current RES active power output information and on the forecasted RES active power output, determine whether an expected ramp rate of the RES active power output during said predefined time period exceeds a predefined maximum ramp rate limit of a plant active power output. The plant active power output is a combination of the RES active power output and an ESS active power output, of an ESS comprised in the power plant, at any given time. The controller is also operative to, based on said determining whether the expected ramp rate exceeds the maximum ramp rate limit, select a first control method which is based on the forecasted future RES active power output if it is/was determined that the expected ramp rate exceeds the predefined maximum ramp rate limit during the predefined time period, or select a second control method, which is different from the first control method, if it is/was determined that the expected ramp rate does not exceed the predefined maximum ramp rate limit during the predefined time period. The controller is also operative to use the selected first or second control method to generate an ESS control signal for controlling the ESS active power output such that the plant active power output ramp rate is kept below the predefined maximum ramp rate limit during the predefined time period.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

When power is discussed herein, active power is intended unless otherwise stated.

Figure 1:
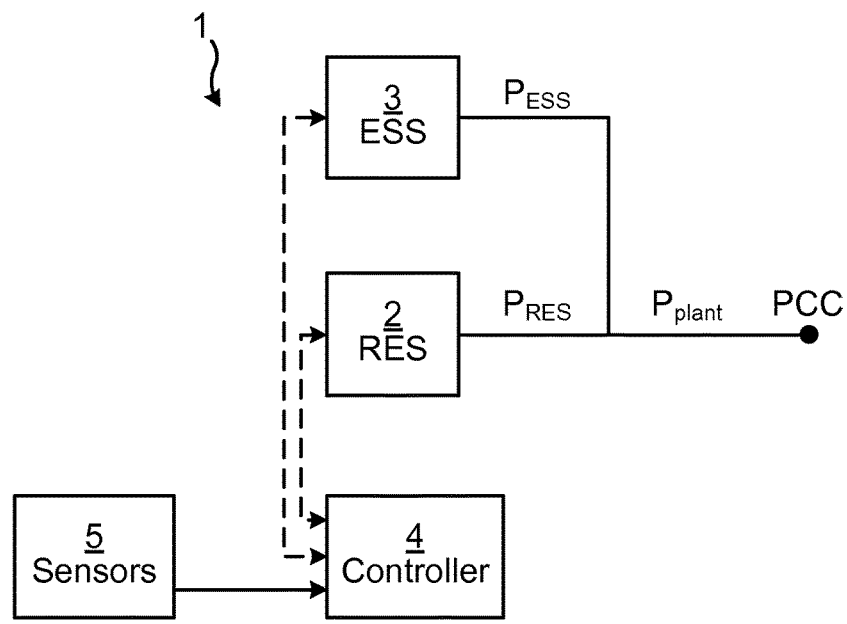
FIG. 1 is a schematic block diagram of an embodiment of a power plant in accordance with an embodiment of the present invention.

FIG. 1 is a schematic block diagram of an embodiment of a power plant 1 in accordance with an embodiment of the present invention.

A RES 2, e.g. solar, wind and/or wave power generator system, is connected to a power grid via a PCC. The RES generates a (positive or negative, but typically positive) output of active power $P_{RES}$. Since the RES output may vary based on e.g. the weather, an ESS 3, e.g. a BESS or a flywheel or the like, is also comprised in the power plant 1 to compensate for the varying output of the RES by outputting positive or negative active power $P_{ESS}$ which is combined with the $P_{RES}$ to form the active power $P_{Plant}$ outputted by the power plant to the power grid via the PCC:

$$P_{Plant}=P_{RES}+P_{ESS} \quad (1)$$

where $P_{ESS}$ is the charge/discharge power of the ESS. If a closed loop model is used, a negative feedback from the ESS State of Charge (SoC) prevents the SoC from drifting in the long term.

A controller 4 is also comprised in the power plant 1. The controller 4 is configured for generating and sending a control signal to the ESS 3 for controlling the (positive or negative) output of power $P_{ESS}$ from the ESS. The controller may also continuously or periodically receive information about present (herein also called current) power output $P_{ESS}$ from a power sensor in or downstream of the ESS 3. The controller continuously or periodically receives information about present (herein also called current) power output $P_{RES}$ from a power sensor in or downstream of the RES 2. In some embodiments, the controller may also be configured for generating and sending a control signal to the RES 2 for controlling (typically pre-emptively reducing) the output of power $P_{RES}$ from the RES.

The controller 4 may also receive input signals from external sensors, e.g. meteorological sensors such as weather sensors for e.g. solar radiation, wind speed and the like, possibly placed some distance away from the power plant 1, for aiding the controller 4 in forecasting future power output $P_{RES}$ from the RES 2.

Figure 2:
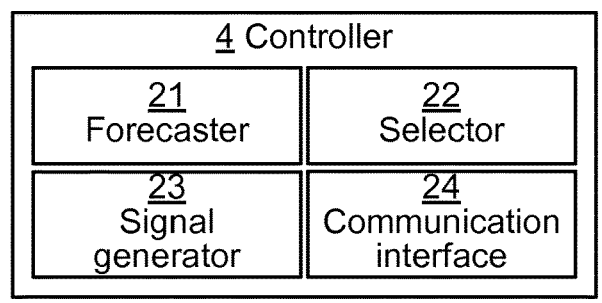
FIG. 2 is a schematic block diagram of an embodiment of a controller in accordance with the present invention.

FIG. 2 is a schematic block diagram of an embodiment of a controller 4 in accordance with the present invention. The controller comprises processor circuitry, e.g. of a processor or an FPGA, which may run software stored in a storage unit, e.g. of a memory or an FPGA, of the controller, for enabling the controller 4 to perform an embodiment of a method of the present disclosure, whereby functional modules may be formed in the controller e.g. in its processor circuitry, for performing the different steps of the method. These modules are schematically illustrated as blocks within the controller 4. Thus, the controller comprises a communication interface module 24 for obtaining information about a current RES active power output $P_{RES}$ of a RES 2 comprised in the power plant, as well as for sending an ESS control signal to the ESS 3 for controlling the ESS active power output $P_{ESS}$. The controller also comprises a forecaster module for forecasting future RES active power output $P_{RES}$, during a predefined future time period and for based on the obtained current RES active power output information and on the forecasted RES active power output, determining whether an expected ramp rate of the RES active power output $P_{RES}$ during said future time period exceeds a predefined maximum ramp rate limit of a plant active power output $P_{Plant}$. The controller also comprises a selector module 22 for based on said determining whether the expected ramp rate exceeds the maximum ramp rate limit, selecting a first control method which is based on the forecasted future RES active power output $P_{RES}$ if it was determined that the expected ramp rate exceeds the predefined maximum ramp rate limit during the future time period, or selecting a second control method which is not based on the forecasted future RES active power output $P_{RES}$ if it was determined that the expected ramp rate does not exceed the predefined maximum ramp rate limit during the future time period. The controller also comprises a signal generator module 23 for generating an ESS control signal, in accordance with the selected control method, for controlling the ESS active power output $P_{ESS}$ such that the plant active power output $P_{Plant}$ ramp rate is kept below the predefined maximum ramp rate limit during the time period. In other embodiments, the modules 21-24 may be formed by hardware, or by a combination of hardware and software.

Figure 3:
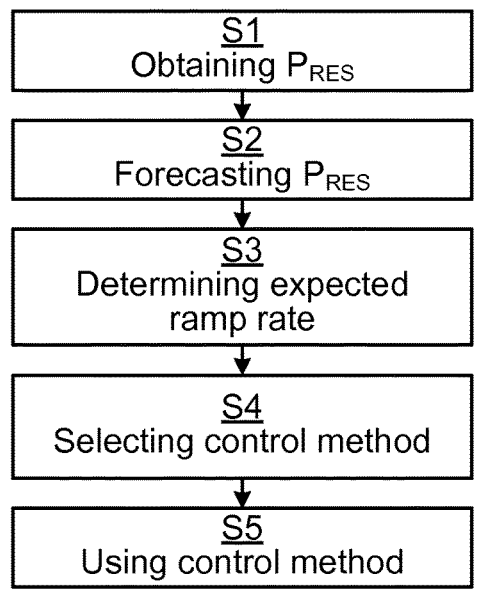
FIG. 3 is a schematic flow chart of an embodiment of a method of the present invention.

FIG. 3 is a schematic flow chart of an embodiment of a method of the present invention, for controlling plant active power output $P_{Plant}$ ramp rate of a power plant 1 to a PCC with a power grid.

Information about a current RES active power output $P_{RES}$ of a RES 2 comprised in the power plant is obtained S1.

Future RES active power output $P_{RES}$ during a predefined future time period is forecasted S2. In some embodiments, the forecasting S2 is based on input signals from a sensor 5, e.g. a meteorological sensor such as a sensor of solar radiation or wind speed. In some embodiments, the forecasting is based on numerical analysis of past RES active power output $P_{RES}$. In some embodiments, the forecasting is based on a combination of such sensor input and such numerical analysis.

Based on the obtained current RES active power output information and on the forecasted RES active power output, it is then determined S3 whether an expected ramp rate of the RES active power output $P_{RES}$ during said future time period exceeds a predefined maximum ramp rate limit of a plant active power output $P_{Plant}$. The plant active power output $P_{Plant}$ is, as mentioned above, a combination (sum) of the RES active power output $P_{RES}$ and an ESS active power output $P_{ESS}$, of an ESS 3 comprised in the power plant, at any given time.

Based on said determining S3 whether the expected ramp rate exceeds the maximum ramp rate limit, there is selection S4 of a first control method which is based on the forecasted future RES active power output $P_{RES}$ if it was determined that the expected ramp rate exceeds the predefined maximum ramp rate limit during the future time period. Otherwise, there is a selection S4 of a second control method, which is different from the first control method, if it was determined that the expected ramp rate does not exceed the predefined maximum ramp rate limit during the future time period. The second control method may e.g. be based on the forecasted future RES active power output $P_{RES}$ to a lesser degree than the first control method, or not at all. The second control method may e.g. use a combination of less than 50%, e.g. between 20 and 5%, of an FCRR method discussed herein and at least 50% of the STDRR method discussed herein, or only the STDRR method.

Then, the selected first or second control method is used S5 to generate an ESS control signal for controlling the ESS active power output $P_{ESS}$ such that the plant active power output $P_{Plant}$ ramp rate is kept below the predefined maximum ramp rate limit during the time period (the time period being the same time period which is above called the future time period, but may strictly speaking no longer be future, but rather current).

Figure 4:
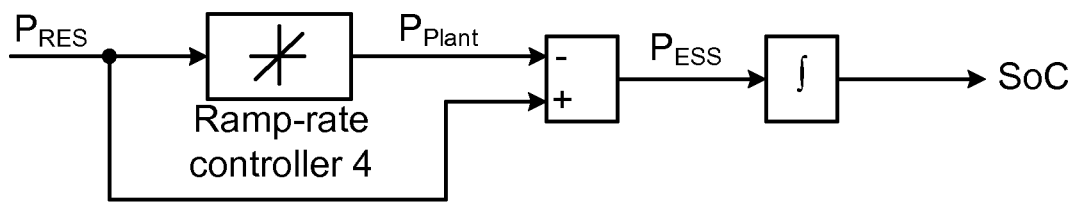
FIG. 4 is a schematic functional block diagram of an open loop control method.

FIG. 4 is a schematic functional block diagram of an embodiment of an open loop control model for controlling the SoC of the ESS 3, which may be used with some embodiments of the present invention.

Figure 5:
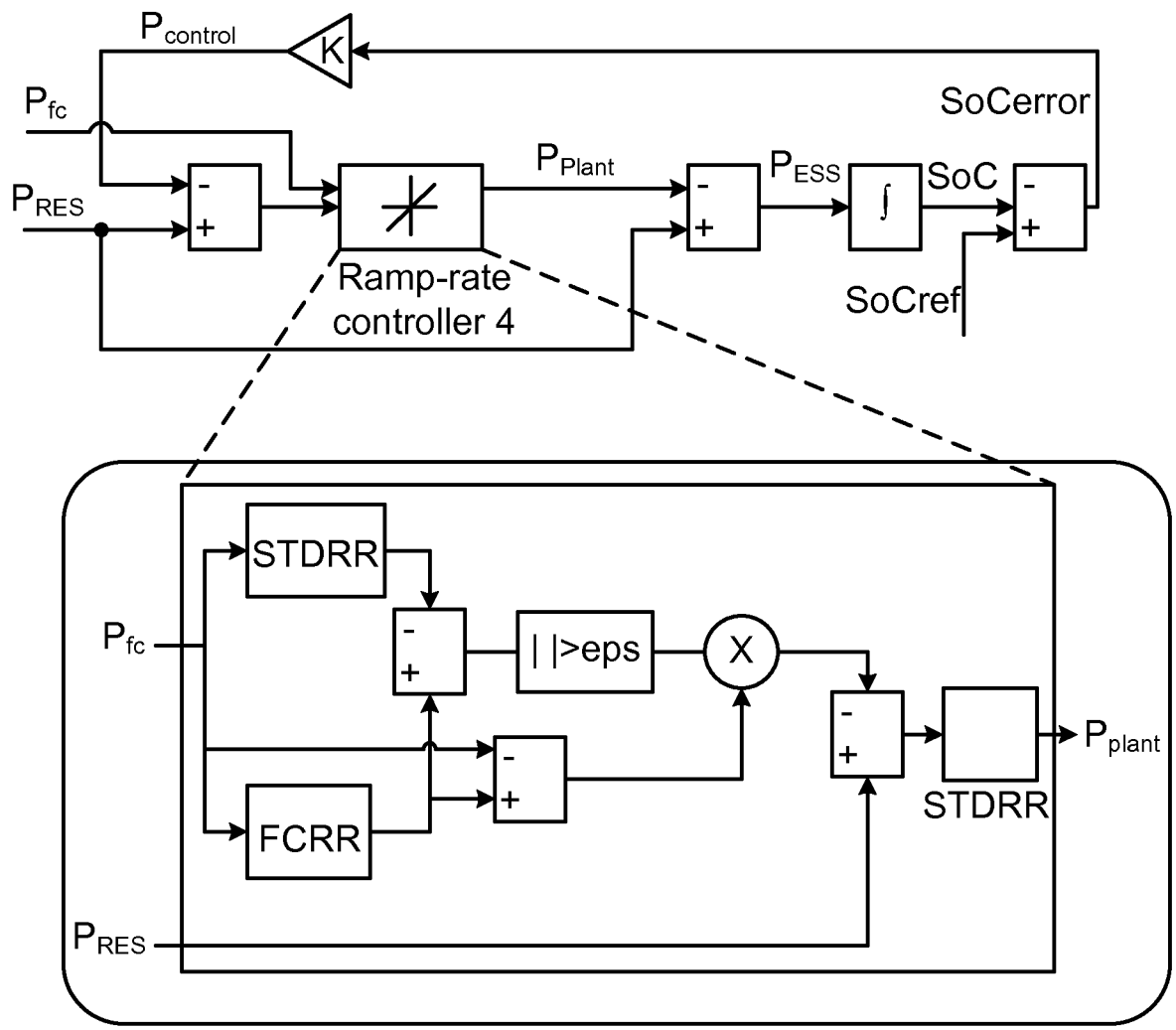
FIG. 5 is a schematic functional block diagram of a closed loop control model, comprising a functional block diagram illustrating an embodiment of a controller in accordance with the present invention.

FIG. 5 is a schematic functional block diagram of an embodiment of a closed loop control model for controlling the SoC of the ESS 3, which may be used with some embodiments of the present invention. FIG. 5 also shows a schematic functional representation of an embodiment of a ramp rate controller 4 of the present invention. The controller 4 selects between a standard ramp rate control method (STDRR) and a forecast ramp rate control method (FCRR) based on forecasted power output $P_{fc}$ of the RES 2.

The STDRR control which is a simpler method for ramp rate control, in which $P_{Plant}$ may follow $P_{RES}$ with the limitation $$\left|\frac{dP_{plant}}{dt}\right| \le r_l \qquad (2)$$

where $r_l$ is the ramp-rate limit. Therefore, if $P_{RES}$ experiences a faster ramp than $r_l$, $P_{plant}$ follows $P_{RES}$ with some lag, otherwise $P_{Plant}=P_{RES}$. The STDRR method does not require any forecast of the RES power output.

A ramp-rate control may also use short term power forecast to be able to react beforehand to the upcoming ramps in the active power of the RES 2. The aim may for example be to limit the active power gradient while minimizing the energy throughput of the ESS 3. This may be done by minimizing the cost function $$C(t) = \int_t^{t+t_f} (P_{plant}(\tau) - P_{RES,fc}(\tau))^2 d\tau. \qquad (3)$$

The cost function of equation (3) is also subject to the criteria of equation (2)

$$\left|\frac{dP_{plant}}{dt}\right| \le r_l.$$

In equation (3), $P_{RES,fc}$ is a forecast of $P_{RES}$ and $t_f$ is the forecast horizon (i.e. the length of the predetermined future time period discussed herein). To distinguish this method from variations presented in the following, it will be referred to as $FCRR_{fp}$. Although the optimal trajectory $P^*_{Plant}$ is calculated until the end of the forecast horizon, only the calculated values until the next periodic forecast update may be used. In the next forecast update, a new optimization may be performed. It is assumed that the time interval (period) between the successive forecast updates is shorter than the forecast horizon.

Figure 6:
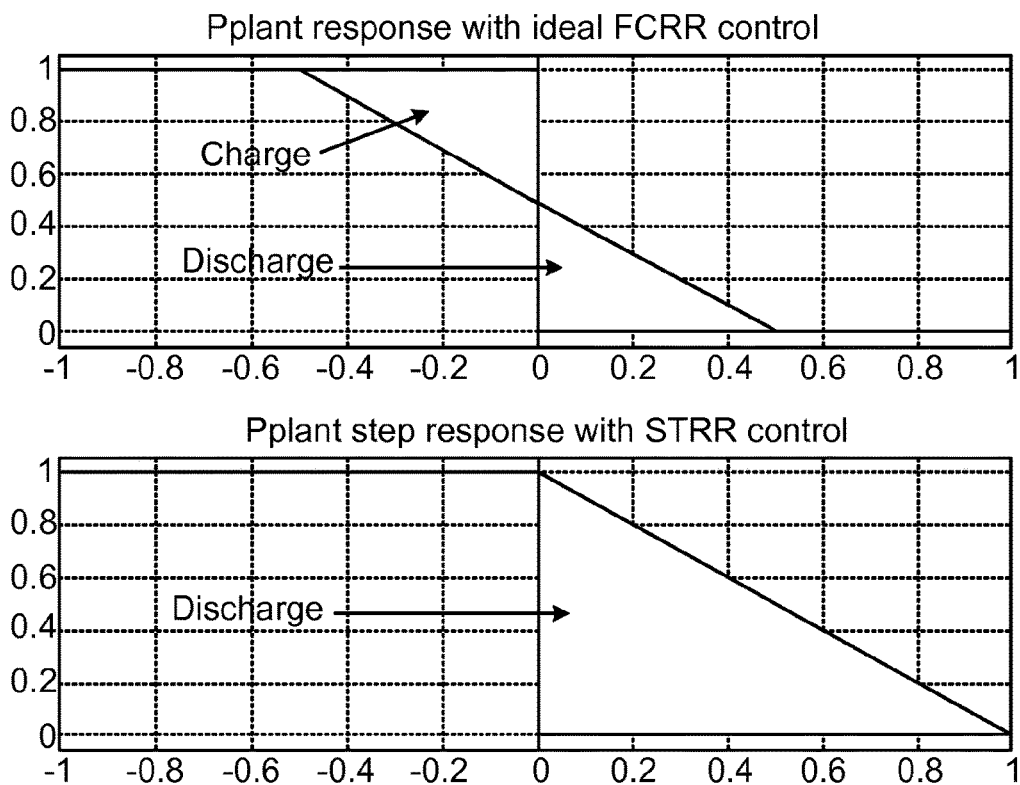
FIG. 6 shows graphs illustrating difference in ESS operation for the STDRR and FCRR control methods, respectively.

Motivation for using forecasts in control for ramp rate limitation can be found from studying FIG. 6. Here, an ideal step (from 1 to 0) in the RES 2 power output $P_{RES}$ is assumed. In the lower part of the figure, a BESS 3 using the STDRR method is assumed. It is seen that the BESS limits the ramp rate to the required level leading to a lagging response of power of the whole plant 1 ($P_{Plant}$). The shaded area in the figure represents the discharged energy from the BESS 3. In the upper part of the figure, a BESS 3 equipped with an FCRRfp scheme based on an ideal forecast of the RES power output is assumed. It is seen that the BESS can in this case prepare for the event before the change in $P_{RES}$ and thus charge up the battery prior to the discharge. This leads in the ideal case to that the SoC of the BESS will be at the same level before and after the event which is not the case in the STDRR case.

It can also be noted from FIG. 6 that the energy throughput of the BESS 3 is significantly smaller with the FCRR control method. In fact, the FCRR method decreases the BESS throughput power with up to a factor of 4 compared to the STDRR method in the ideal case.

Also the depth of discharge (DoD) of the BESS 3 due to the event will in the ideal case be minimized by means of the FCRR control method and significantly reduced from the STDRR case. This feature may be used either to lower the required energy rating of the BESS 3 or lower the average DoD level for multiple events assuming the same energy rating for both control methods. A lower average DoD and a lower energy throughput will yield a longer lifetime for the batteries since the lifetime is significantly deteriorated for cycles with a larger DoD.

In real life, however, the RES power forecasts are typically not perfect. The prior-art FCRR methods are very sensitive to forecast errors. In fact, the $FCRR_{fp}$ method may perform worse than the STDRR method in the presence of realistic forecast errors. This will significantly increase the energy throughput of the ESS 3.

According to the present disclosure, a step to decrease the energy throughput is to use the $FCRR_{fp}$ method only if there is a violation forecasted within the forecast horizon. Otherwise, the STDRR method is used. This combination of methods will herein be denoted $FCRR_{fb}$-STDRR.

Figure 7:
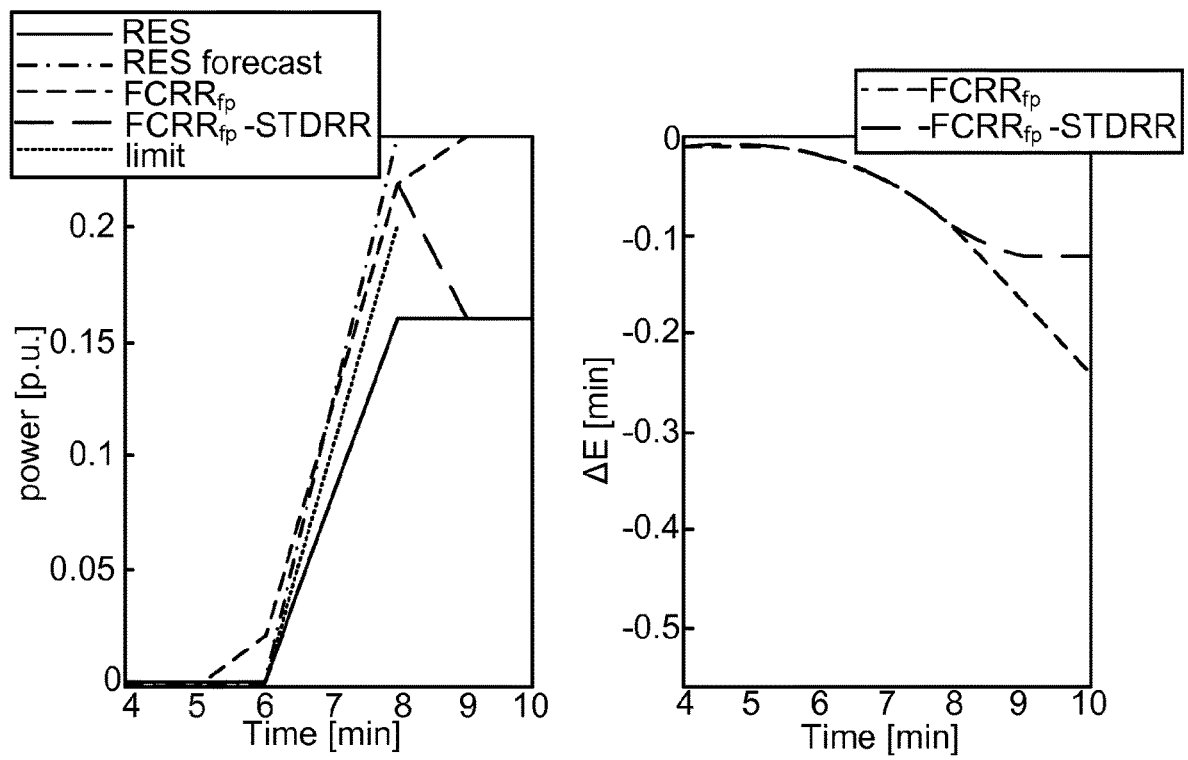
FIG. 7 shows graphs of simulation results for the inventive $FCRR_{fp}$-STDRR control method embodiment and references.

The effect of this modification is presented in FIG. 7, which presents a 2-minute long power ramp. In this case, the forecast is performed at every full minute. The actual (current) power $P_{RES}$ (solid line) does not violate the ramp-rate limit (dotted line), as shown in the left hand graph showing the forecasted and real power outputs $P_{Plant}$ for different methods. However, the $P_{RES}$ forecast (dash-dot-dash line) indicates a future ramp rate violation. In this case, the values of $P_{RES,f}$ are taken from forecast line. If the $FCRR_{fp}$ method is used, the $P_{Plant}$ follows the forecast at each time. This results in continuous decrease in the ESS 3 energy as shown in the right hand graph showing the changes in ESS state. If the $FCRR_{fp}$ method is used only when there is a ramping violation is expected, at the end of ramping (according to the forecast), the STDRR method takes over and $P_{Plant}$ starts to follow $P_{RES}$ instead as shown by the FCRR-STDRR (long-dash line). Therefore, the change in the ESS state is significantly reduced.

Alternatively, the minimization of C(t) in Eq. (3) may be used to determine the future ESS power $P_{ESS}$ instead of determining the future plant power $P_{Plant}$. In also this method, denoted $FCRR_{fb}$, the forecast will only be used when a ramp violation is forecasted, otherwise the STDRR method may be used. The $FCRR_{fb}$ method may have a lower sensitivity to forecast errors.

Figure 8:
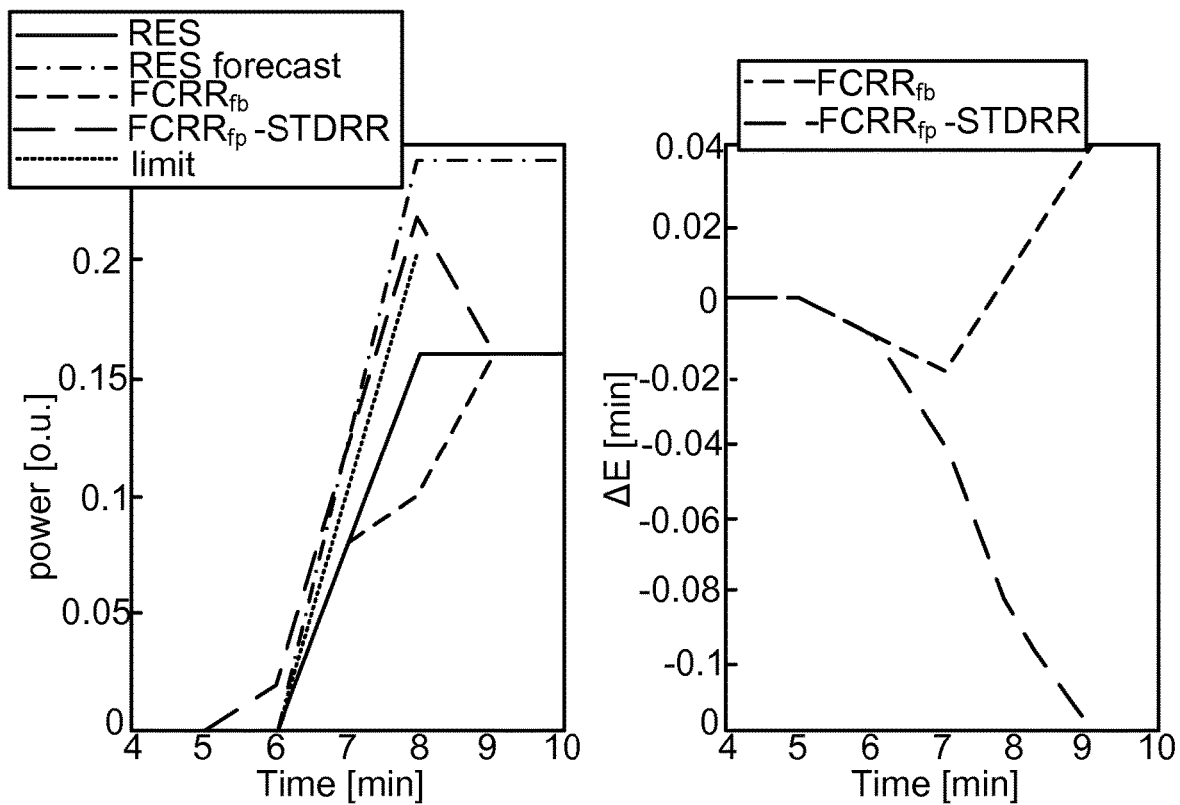
FIG. 8 shows graphs of simulation results for the inventive $FCRR_{fb}$ control method embodiment and references.

The $FCRR_{fb}$ method was tested in the same manner as in FIG. 7, as shown in FIG. 8. The power response $P_{Plant}$ and corresponding changes in the ESS state are shown in the same manner, in the left and right hand sides of the figure, respectively. It can be seen that the $FCRR_{fb}$ method (short-dash line) yields a significantly smaller energy throughput than the $FCRR_{fp}$-STDRR method (long-dash line). The $FCRR_{T}f$ method roughly halves the energy throughput in comparison to the $FCRR_{fp}$-STDRR method in this case.

The $FCRR_{fb}$ method reduces the energy throughput of the ESS in comparison to the $FCRR_{fp}$-STDRR method, as shown in FIG. 8. To further decrease the ESS energy throughput, a further modification may be made. At the time of the most recent $P_{RES}$ forecast update, besides performing the minimization of the cost function in Eq. (3) to get the expected optimal ESS power, the standard ramp rate control method STDRR may be performed for the given forecast. The two optional curves for $P_{Plant}$ may be compared and for the time intervals where the curves differ more than a specified limit ε, the ESS power given by $FCRR_{fb}$ is used. For the remaining time interval(s), the STDRR method may be used. This method is denoted $FCRR_{fbm}$. One motivation for this modification is that a certain magnitude and duration of the predicted ramp violation may be required to avoid the forecast method being used when it is not really needed, thus avoiding unnecessary ESS action due to inaccuracies in the forecast.

Figure 9:
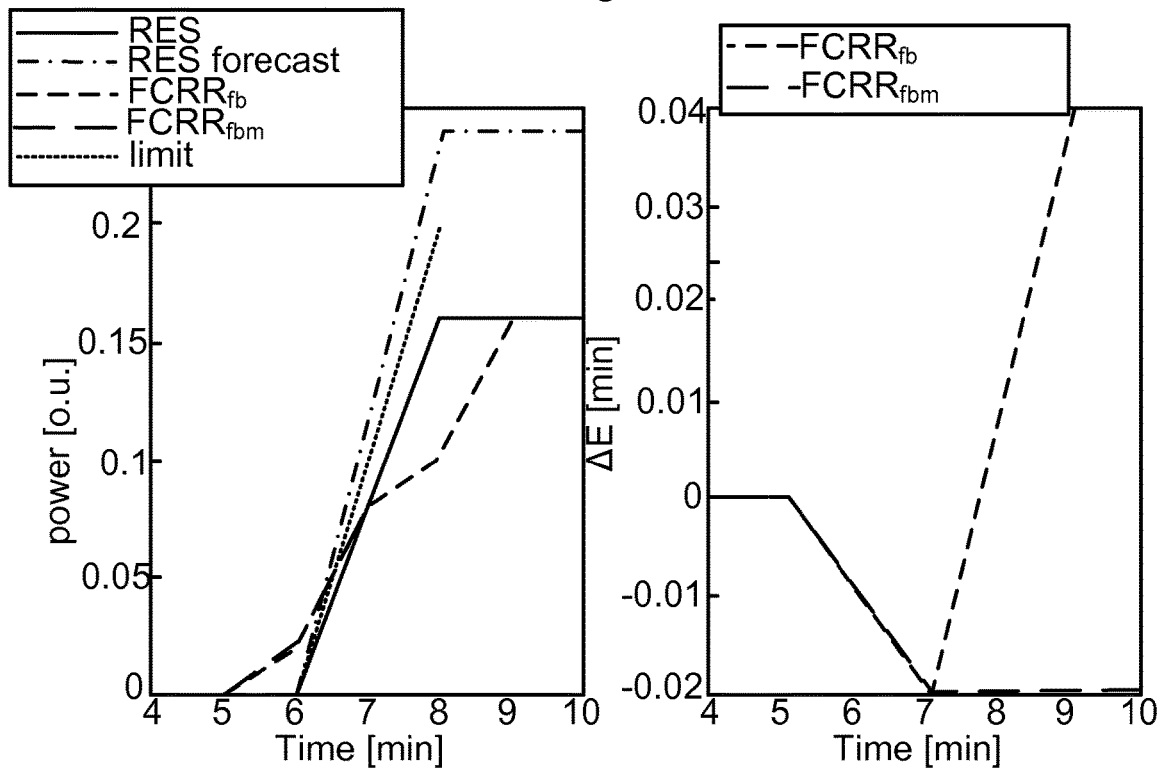
FIG. 9 shows graphs of simulation results for the inventive $FCRR_{fbm}$ control method embodiment and references.

The $FCRR_{fbm}$ method was also used in the same manner as in FIGS. 7 and 8, as shown in FIG. 9. The power response $P_{Plant}$ and corresponding changes in the ESS state are shown in the same manner, in the left and right hand sides of the figure, respectively. It can be seen from FIG. 9 that the $FCRR_{fbm}$ method yields significantly smaller ESS energy throughput than the $FCRR_{fb}$ method. In the left hand graph, the $FCRR_{fbm}$ method line follows the $FCRR_{fb}$ method line till it intersects the current $P_{RES}$ line (solid line) after which it follows said current $P_{RES}$ line. In consequence, in the right hand graph, the $FCRR_{fbm}$ method line follows the $FCRR_{fb}$ method line till it reaches about −0.02, after which the $FCRR_{fbm}$ method line remains constant at −0.02.

Another modification of the method for ramp rate control, called robust control (RC) has also been developed. Similarly to the FCRR methods, it uses RES power forecasts to prepare for a power ramping event. The scheme of the control system is presented in FIG. 10. This scheme may be advantageous in some scenarios depending on the RES power variance and forecast accuracy.

Figure 10:
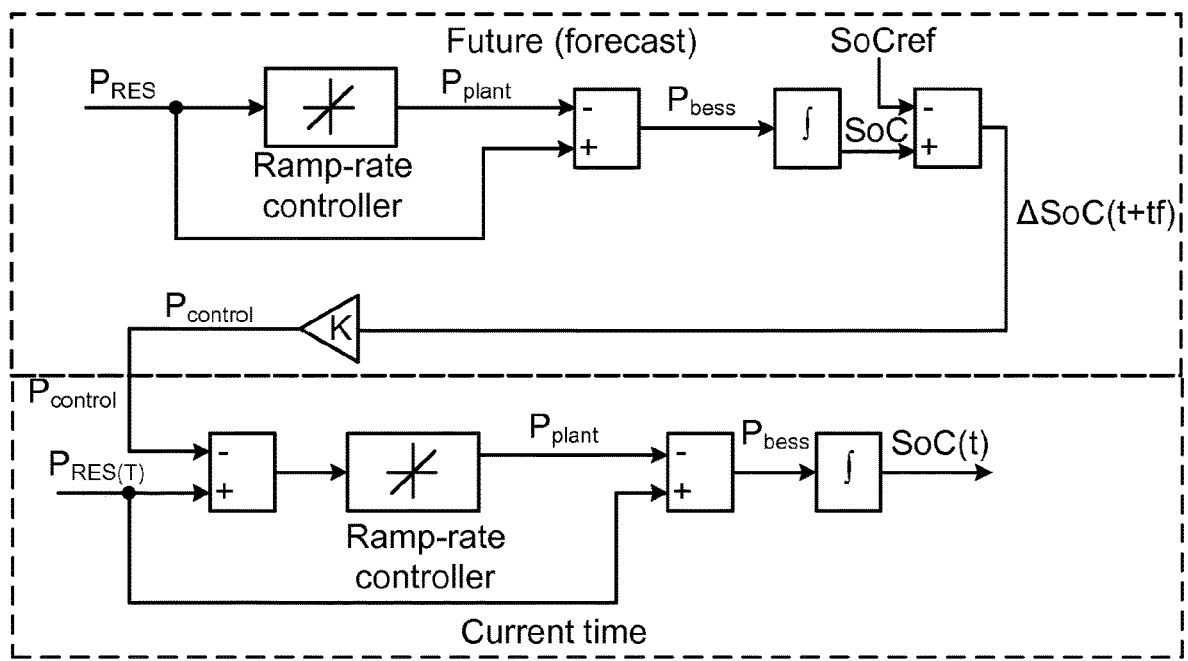
FIG. 10 is a schematic functional block diagram illustrating the inventive RC control method embodiment.

In the RC method, the standard ramp rate control method STDRR is performed for the given forecast horizon and the corresponding predicted deviation of the ESS State of charge (SoC) from the SoC set point $SoC_{ref}$ at the end of the forecast horizon is calculated (top section in FIG. 10). The predicted deviation ΔSoC(t+tf) is used to control the ESS 3 (bottom section in FIG. 10). However, in this case, the proportional gain K is dependent on the forecast:

$$K = \begin{cases} k\dfrac{t_f - t_v}{t_f}, & \text{violation predicted,} \\ k, & \text{no violation predicted} \end{cases} \quad (4)$$

Here, $t_v$ is the time of the ramp rate violation where $t_v$ attains values between 0 and $t_f$. The coefficient k defines the aggressiveness of the control. If a ramp rate violation is predicted, the controller gain K is higher the sooner the violation is predicted (the smaller $t_v$ is). If no ramp rate violation is predicted, the controller gain equals the coefficient k.

Figure 11:
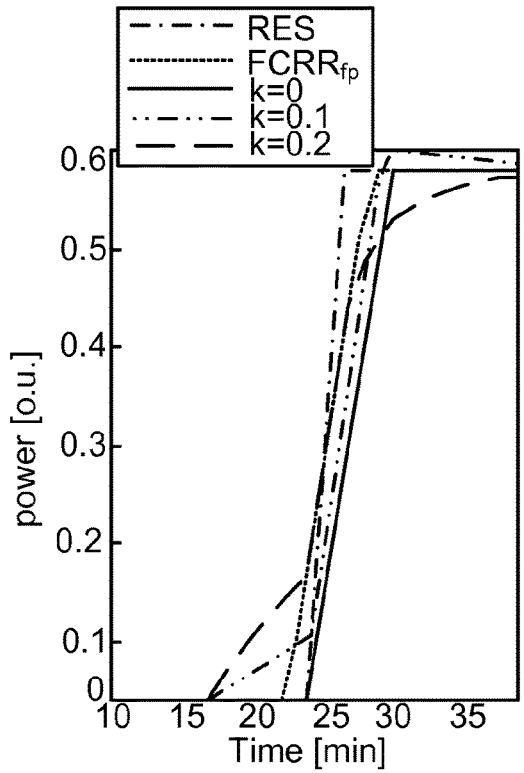
FIG. 11 is a graph of simulation results for the inventive RC control method embodiment for different coefficients k.
Figure 11:
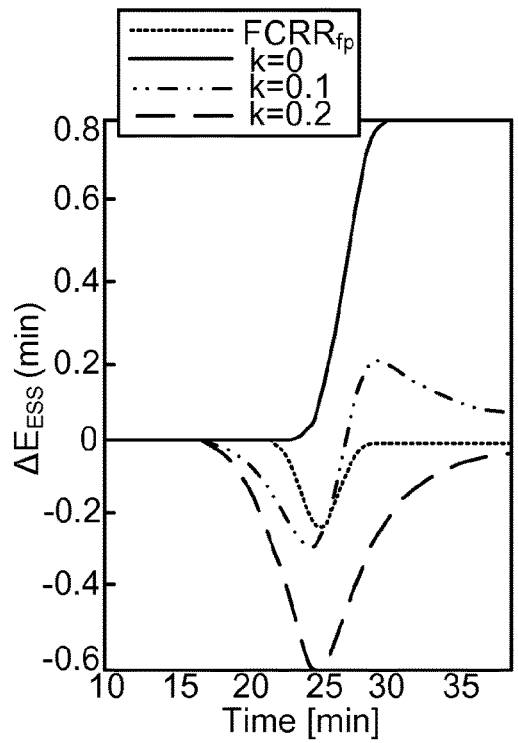

The value of k plays a significant role in the controller 4 performance. If the value of k is small, the control actions are small but the control sensitivity to the forecast error is small. When k→0, the RC method approaches the STDRR control method. On the other hand, when the value of k increases, the control acts more aggressively and the sensitivity of the control to the forecast errors increase. The effect of the choice of the k value is demonstrated in FIG. 11, where a ramp-up event with a ramp rate limit of 0.1 p.u./min is presented. The figure also shows the power response when the $FCRR_{fp}$ method is used. Here, an ideal forecast is assumed. FIG. 11 shows how the RC method acts like the STDRR method when k=0.

When k=0.1, the RC method reacts to the upcoming ramp by discharging the ESS 3. During the ramping, the ESS 3 is charged to a SoC that is greater than the initial SoC. After ramping, the RC returns the SoC back to the set point by discharging energy. FIG. 11 also shows how the $FCRR_{fp}$ method yields a smaller energy throughput than the RC method if the power forecast is ideal. Actually, no other method may be able to yield a smaller ESS energy throughput than the $FCRR_{fp}$ method if the forecast is ideal. However, as mentioned above, the forecasting is often not ideal.

Embodiments of the method of the present invention were designed in order to minimize the energy throughput of the ESS 3. Doing so enables use of smaller energy storage capacities and reduces the losses related to the ESS.

Moreover, if the ESS is a BESS, minimizing the energy throughput will also result in a longer battery lifetime.

The advantages of the proposed control method increase for better forecast accuracy and for stricter ramp rate limits. It has been found that a wind power forecast error of between 3% and 5% for a 10 minute forecast is realistic with available forecasting methods. The maximum BESS power requirement may with the proposed method embodiments be decreased according to simulation results. Moreover, the energy-to-power ratio may be significantly reduced, which in practice means that a battery with smaller energy capacity may be used. Further, the cyclic degradation of batteries may be reduced.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions (software) stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for controlling plant active power output ramp rate of a power plant to a Point of Common Coupling, PCC, with a power grid, the method comprising:

obtaining information about a current RES active power output of a Renewable Energy Source, RES, comprised in the power plant;

forecasting future RES active power output, during a predefined future time period, based on input signals from a meteorological sensor;

based on the obtained current RES active power output information and on the forecasted RES active power output, determining whether an expected ramp rate of the RES active power output during said predefined time period exceeds a predefined maximum ramp rate limit of a plant active power output, the plant active power output being a combination of the RES active power output and an ESS active power output, of an Energy Storage System, ESS, comprised in the power plant, at any given time;

selecting a first control method which is based on the forecasted future RES active power output when it has been determined that the expected ramp rate exceeds the predefined maximum ramp rate limit during the predefined time period, wherein the first control method is a forecast ramp rate (FCRR) control method that is based on only the forecasted future RES active power output;

selecting a second control method which is not based on the forecasted future RES active power output when it has been determined that the expected ramp rate does not exceed the predefined maximum ramp rate limit during the predefined time period, wherein the second control method is a combination of less than 50% of the FCRR control method and at least 50% of a standard ramp rate (STDRR) control method that does not require any forecasted future RES active power output; and generating an ESS control signal for controlling the ESS active power output such that the plant active power output ramp rate is kept below the predefined maximum ramp rate limit during the predefined time period, wherein the ESS control signal is generated using the selected one of the first control method and the second control method, no matter which one of the first control method and the second control method is selected, wherein the first control method and the second control method are two different control methods that are independent of each other, and lead to different ESS control signals respectively.

2. The method of claim 1, wherein the sensor is placed a distance away from the power plant.

3. The method of claim 1, wherein the forecasting is based on input signals from a sensor of solar radiation or wind speed.

4. The method of claim 1, wherein the forecasting is based on numerical analysis of past RES active power output.

5. The method of claim 1, wherein the first control method comprises generating a RES control signal for reducing the RES active power output during said predefined time period.

6. The method of claim 1, wherein the first control method comprises minimizing a cost function C(t) of time t where $P_{RES,fc}$ is a forecast of the RES active power output $P_{RES}$ and $t_f$ is the length of the predefined time period, according to:

$$C(t) = \int_{t}^{t+t_f} (P_{plant}(\tau) - P_{RES,fc}(\tau))^2 d\tau$$

subject to $$\left| \frac{dP_{plant}}{dt} \right| \leq r_l$$

wherein $r_l$ is the ramp rate limit.

7. The method of claim 1, wherein the first control method comprises utilizing a gain which is dependent on a coefficient as well as the length of the predefined time period and the time when the expected ramp rate exceeds the maximum ramp rate limit if the expected ramp rate exceeds the maximum ramp rate limit, while the gain is equal to the coefficient if the expected ramp rate does not exceed the maximum ramp rate limit.

8. The method of claim 1, wherein the method is performed periodically with a period which is shorter than the length of the predefined time period.

9. The method of claim 1, wherein the predefined time period has a length of less than 1 hour, such as a length within the range of 1 or 10 minutes to 1 hour.

10. A computer program product comprising computer-executable components for causing a controller to perform the method of claim 1 when the computer-executable components are run on processor circuitry comprised in the controller.

11. A controller for controlling plant active power output ramp rate of a power plant to a Point of Common Coupling, PCC, with a power grid, the controller comprising:
processor circuitry; and
a storage unit storing software executable by said processor circuitry whereby said controller is operative to:
obtain information about a current RES active power output of a Renewable Energy Source, RES, comprised in the power plant;
forecast future RES active power output, during a predefined future time period, based on input signals from a meteorological sensor;
based on the obtained current RES active power output information and on the forecasted RES active power output, determine whether an expected ramp rate of the RES active power output during said predefined time period exceeds a predefined maximum ramp rate limit of a plant active power output, the plant active power output being a combination of the RES active power output and an ESS active power output, of an Energy Storage System, ESS, comprised in the power plant, at any given time;
select a first control method which is based on the forecasted future RES active power output when it has been determined that the expected ramp rate exceeds the predefined maximum ramp rate limit during the predefined time period, or select a second control method which is not based on the forecasted future RES active power output ($P_{RES}$) when it has been determined that the expected ramp rate does not exceed the predefined maximum ramp rate limit during the predefined time period, wherein the first control method is a forecast ramp rate (FCRR) control method that is based on only the forecasted future RES active power output, and the second control method is a combination of less than 50% of the FCRR control method and at least 50% of a standard ramp rate (STDRR) control method that does not require any forecasted future RES active power output; and
generate an ESS control signal for controlling the ESS active power output such that the plant active power output ramp rate is kept below the predefined maximum ramp rate limit during the predefined time period, wherein the ESS control signal is generated using the selected one of the first control method and the second control method, no matter which one of the first control method and the second control method is selected,
wherein the first control method and the second control method are two different control methods that are independent of each other, and lead to different ESS control signals respectively.

12. The method of claim 2, wherein the forecasting is based on input signals from a sensor of solar radiation or wind speed.

13. The method of claim 2, wherein the forecasting is based on numerical analysis of past RES active power output.

14. The method of claim 3, wherein the forecasting is based on numerical analysis of past RES active power output.

15. The method of claim 2, wherein the first control method comprises generating a RES control signal for reducing the RES active power output during said predefined time period.

16. The method of claim 3, wherein the first control method comprises generating a RES control signal for reducing the RES active power output during said predefined time period.

17. The method of claim 4, wherein the first control method comprises generating a RES control signal for reducing the RES active power output during said predefined time period.

18. The method of claim 2, wherein the first control method comprises minimizing a cost function C(t) of time t where $P_{RES, fc}$ is a forecast of the RES active power output $P_{RES}$ and $t_f$ is the length of the predefined time period, according to:

$$C(t) = \int_t^{t+t_f} (P_{plant}(\tau) - P_{RES,fc}(\tau))^2 d\tau$$

subject to $$\left| \frac{dP_{plant}}{dt} \right| \leq r_l$$

wherein $r_l$ is the ramp rate limit.

19. The method of claim 3, wherein the first control method comprises minimizing a cost function C(t) of time t where $P_{RES, fc}$ is a forecast of the RES active power output $P_{RES}$ and $t_f$ is the length of the predefined time period, according to:

$$C(t) = \int_t^{t+t_f} (P_{plant}(\tau) - P_{RES,fc}(\tau))^2 d\tau$$

subject to $$\left| \frac{dP_{plant}}{dt} \right| \leq r_l$$

wherein $r_l$ is the ramp rate limit.

20. The method of claim 1, wherein the first control method is using the FCRR control method that is based on only the forecasted future RES active power output only when there is a ramping violation forecasted, and then using the STDRR control method that does not require any forecasted future RES active power output instead of the FCRR control method at the end of ramping.

* * * * *